United States Patent
Allan et al.

(10) Patent No.: US 9,319,268 B2
(45) Date of Patent: Apr. 19, 2016

(54) Q-IN-Q ETHERNET RINGS

(71) Applicant: RPX Clearinghouse LLC, San Francisco, CA (US)

(72) Inventors: David Allan, Ottawa (CA); Nigel Bragg, Weston Colville (GB); Marc Holness, Ottawa (CA)

(73) Assignee: RPX Clearinghouse LLC, San Francisco, CA (US)

( * ) Notice: Subject to any disclaimer, the term of this patent is extended or adjusted under 35 U.S.C. 154(b) by 185 days.

(21) Appl. No.: 14/251,999

(22) Filed: Apr. 14, 2014

(65) Prior Publication Data

US 2014/0226463 A1  Aug. 14, 2014

Related U.S. Application Data

(63) Continuation of application No. 11/477,975, filed on Jun. 29, 2006.

(51) Int. Cl.
 *H04L 12/437* (2006.01)
 *H04L 12/24* (2006.01)
 *H04L 12/46* (2006.01)
 *H04L 12/42* (2006.01)

(52) U.S. Cl.
 CPC .......... *H04L 41/0668* (2013.01); *H04L 12/437* (2013.01); *H04L 12/465* (2013.01); *H04L 12/4641* (2013.01); *H04L 2012/421* (2013.01)

(58) Field of Classification Search
 None
 See application file for complete search history.

(56) References Cited

U.S. PATENT DOCUMENTS

| 5,297,137 A | 3/1994 | Ofek et al. |
| 5,408,610 A | 4/1995 | Arakawa |
| 5,778,003 A | 7/1998 | Puppa et al. |
| 6,272,107 B1 | 8/2001 | Rochberger et al. |

(Continued)

FOREIGN PATENT DOCUMENTS

| CN | 1691609 A | 11/2005 |
| EP | 0920153 A2 | 6/1999 |

(Continued)

OTHER PUBLICATIONS

Japanese Final Rejection in both Japanese and its English translation dated Mar. 18, 2014 for corresponding Japanese National Stage Application Serial No: 2010-537222, Japanese National Stage Entry Date: Aug. 10, 2010, consisting of 6 pages.

(Continued)

*Primary Examiner* — Anh-Vu Ly
*Assistant Examiner* — Hector Reyes Ortiz
(74) *Attorney, Agent, or Firm* — Christopher & Weisberg, P.A.

(57) ABSTRACT

A resilient virtual Ethernet ring has nodes interconnected by working and protection paths. Each node has a set of VLAN IDs (VIDs) for tagging traffic entering the ring by identifying the ingress node and whether the traffic is on the working or protection path. MAC addresses are learned in one direction around the ring. A port aliasing module records in a forwarding table a port direction opposite to a learned port direction. Each node can also cross-connect working and protection paths. If a span fails, the two nodes immediately on either side of the failure are cross-connected to fold the ring. Working-path traffic is cross-connected onto the protection path at the first of the two nodes and is then cross-connected back onto the working path at the second of the two nodes so that traffic always ingresses and egresses the ring from the working path.

21 Claims, 6 Drawing Sheets

(56) References Cited

U.S. PATENT DOCUMENTS

| | | |
|---|---|---|
| 6,366,556 B1 | 4/2002 | Ballintine et al. |
| 6,647,428 B1 | 11/2003 | Bannai et al. |
| 6,717,909 B2 | 4/2004 | Leroux et al. |
| 6,717,922 B2 | 4/2004 | Hsu et al. |
| 6,724,781 B1 | 4/2004 | Dupont |
| 6,766,482 B1* | 7/2004 | Yip ..................... H04L 12/437 370/216 |
| 6,829,347 B1 | 12/2004 | Odiaka |
| 6,882,620 B1 | 4/2005 | MacLellan et al. |
| 6,892,032 B2 | 5/2005 | Milton et al. |
| 6,928,050 B2 | 8/2005 | Lynch et al. |
| 7,035,259 B2 | 4/2006 | Nomura et al. |
| 7,043,250 B1 | 5/2006 | DeMartino |
| 7,065,040 B2 | 6/2006 | Nagamine |
| 7,096,275 B1 | 8/2006 | Doshi et al. |
| 7,133,358 B2 | 11/2006 | Kano |
| 7,142,504 B1 | 11/2006 | Uzun |
| 7,145,882 B2 | 12/2006 | Limaye et al. |
| 7,167,441 B2 | 1/2007 | Donoghue et al. |
| 7,203,748 B2 | 4/2007 | Hare et al. |
| 7,209,975 B1 | 4/2007 | Zang et al. |
| 7,280,470 B2 | 10/2007 | Shiragaki et al. |
| 7,324,440 B2 | 1/2008 | Takagi et al. |
| 7,385,917 B1 | 6/2008 | Mo et al. |
| 7,406,032 B2 | 7/2008 | Li et al. |
| 7,447,429 B2 | 11/2008 | Yamaguchi et al. |
| 7,532,588 B2 | 5/2009 | Enomoto et al. |
| 7,623,446 B1 | 11/2009 | Allan et al. |
| 7,639,709 B1 | 12/2009 | Amis et al. |
| 7,643,407 B2 | 1/2010 | Benvenuti et al. |
| 7,701,848 B2 | 4/2010 | Qiao et al. |
| 7,796,504 B1 | 9/2010 | Owens et al. |
| 7,835,267 B2 | 11/2010 | Zamfir et al. |
| 7,965,938 B2 | 6/2011 | Xu |
| 2002/0176131 A1 | 11/2002 | Walters et al. |
| 2003/0142678 A1 | 7/2003 | Chan et al. |
| 2004/0004937 A1 | 1/2004 | Skalecki et al. |
| 2004/0223503 A1* | 11/2004 | Lynch ................... H04L 12/437 370/404 |
| 2005/0220096 A1 | 10/2005 | Friskney et al. |
| 2006/0013215 A1* | 1/2006 | Kong ..................... H04J 3/1617 370/389 |
| 2006/0039371 A1 | 2/2006 | Castro et al. |
| 2006/0062141 A1 | 3/2006 | Oran |
| 2006/0064479 A1* | 3/2006 | Meged ..................... H04J 3/085 709/224 |
| 2006/0109802 A1 | 5/2006 | Zelig et al. |
| 2007/0047471 A1 | 3/2007 | Florit et al. |
| 2007/0121635 A1 | 5/2007 | Zhou et al. |
| 2007/0177497 A1* | 8/2007 | Quan ................. H04L 12/1877 370/223 |
| 2007/0220175 A1 | 9/2007 | Khanna et al. |
| 2007/0280251 A1* | 12/2007 | Wang .................... H04L 12/437 370/395.1 |

FOREIGN PATENT DOCUMENTS

| | | |
|---|---|---|
| EP | 2365668 A2 | 9/2011 |
| GB | 2357390 A | 6/2001 |
| JP | 60-022849 A | 2/1985 |
| JP | 2000-196642 A | 7/2000 |
| JP | 2001-223728 A | 8/2001 |
| JP | 2004-320186 A | 11/2004 |
| WO | 00/74308 A2 | 12/2000 |
| WO | 2006/011225 A1 | 2/2006 |

OTHER PUBLICATIONS

1st Korean Office Action in both Korean and its English translation dated Jul. 24, 2014 for corresponding Korean National Stage Application Serial No: 2010-7014888, Korean National Stage Entry Date: Jul. 5, 2010 consisting of 7 pages.

Japanese Final Rejection in both Japanese and its English translation dated Sep. 16, 2014 for corresponding Japanese National Stage Application Serial No: 2010-537222, Japanese National Stage Entry Date: Aug. 10, 2010, consisting of 4 pages.

Final Rejection dated Nov. 18, 2014, issued in U.S. Appl. No. 11/477,975, filed Jun. 29, 2006, consisting of 25 pages.

Office Action dated May 8, 2014, issued in U.S. Appl. No. 11/477,975, filed Jun. 29, 2006, consisting of 25 pages.

Steven Cherry, "IEEE Spectrum: Ethernet's High-Wire Act", Date: At least as early as May 29, 2006, consisting of 2 Pages.

"Addign Scale and Operational Simplicity to Ethernet", Nortel Networks, Date: At least as early as Jun. 28, 2006, consisting of 6 Pages.

International Search Report and Written Opinion dated Mar. 17, 2009 for International Application Serial No: PCT/CA2008/002170, International Filing Date: Dec. 12, 2008, consisting of 11 pages.

First Office Action dated Oct. 20, 2009, issued in U.S. Appl. No. 11/955,888, filed Dec. 13, 2007, consisting of 13 pages.

1st Chinese Examination Report and Search Report in both Chinese and its English translation dated Sep. 28, 2012 for corresponding Chinese National Stage Application Serial No: 200880125100.X, Chinese National Stage Entry Date: Jul. 19, 2010, consisting of 8 pages.

2nd Japanese Office Action in both Japanese and its English translation dated Aug. 6, 2013 for corresponding Japanese National Stage Application Serial No: 2010-537222, Japanese National Stage Entry Date: Aug. 10, 2010, consisting of 6 pages.

Chinese Decision on Rejection in both Chinese and its English translation dated Sep. 24, 2013 for corresponding Chinese National Stage Application Serial No: 200880125100.X, Chinese National Stage Entry Date: Jul. 19, 2010, consisting of 8 pages.

Supplementary European Search Report dated Aug. 6, 2013 for corresponding European Application Serial No: 08859716.6, European Filing Date: Jul. 9, 2010, consisting of 9 pages.

* cited by examiner

Q-IN-Q ETHERNET RINGS

CROSS-REFERENCE TO RELATED APPLICATION

This application is a continuation of U.S. patent application Ser. No. 11/477,975, filed Jun. 29, 2006, entitled "Q-IN-Q ETHERNET RINGS", the entirety of which is incorporated herein by reference.

STATEMENT REGARDING FEDERALLY SPONSORED RESEARCH OR DEVELOPMENT n/a

TECHNICAL FIELD

The present invention relates generally to Ethernet and, in particular, to Ethernet rings for Metro Area Networks.

BACKGROUND OF THE INVENTION

Because of its "flood-and-learn" nature, standard Ethernet (IEEE 802.3) is generally unsuitable for network topologies where there is more than one path between any two nodes. The existence of a parallel path creates a loop around which the Ethernet frames circle endlessly, thus overburdening the network. Therefore, Ethernet is best suited to a tree topology rather than a ring. However, ring topologies are desirable for deploying Ethernet in Metro Area Networks where ring topologies are desirable, e.g. for resiliency.

Deployment of large (metro area) Ethernet rings is hindered, however, by the fact that Ethernet rings are prone to endlessly loop unless protocols such as IEEE 802.1D Spanning Tree Protocol (STP) or IEEE 802.1W Rapid Reconfiguration are used to detect and disable parallel branches that create loops. While Spanning Tree Protocol and Rapid Reconfiguration can eliminate loops on Ethernet rings, these protocols introduce recovery lags in the order of tens of seconds, i.e. the time to recover from a fault in the ring is unacceptably high for customers who expect seamless connectivity and undetectable fault correction. In other words, customers expect connectivity to be restored within approximately 50 ms (like SONET does).

A further shortcoming of current Ethernet ring technology as defined in 802.17 is that the MAC-PHY chip that determines which direction to send traffic around the ring is a specialized component where innovation and available bandwidth typically lags other, simpler, Ethernet PHY implementations. Thus, even if all the other components of the Ethernet switches are capable of handling higher rates, as is currently achievable, the ring MAC-PHY chip limits the overall bit-rate of the ring.

Thus, it remains highly desirable to provide a simple, resilient and high-speed virtual ring for frame-based traffic such as Ethernet, particularly for Metro Area Networks.

SUMMARY OF THE INVENTION

An aspect of the present invention is to provide a simple, resilient and high-speed virtual ring for frame-based traffic such as Ethernet that redresses one or more of the deficiencies in the prior art as described above. The resilient virtual ring has a plurality of nodes interconnected by working and protection virtual paths. The virtual ring will have a working path in which traffic flows in one direction, and a protection path in which the traffic flows in the opposite direction. It is conceivable to have multiple virtual rings which have the same routing for the working path and for the protection paths. It is similarly possible to envision multiple virtual rings where the routing is a mirror image, the routing of one or more rings protection path corresponding to the routing of the working path or path of other rings. It is similarly possible to consider a node to simultaneously be a ring node on several topologically disjoint rings at the same time. Each virtual ring implements a unique Ethernet broadcast domain. Each virtual ring is implemented via configured connectivity for a set of VLANs. Traffic upon insertion into the ring is tagged using ring tags which serve to identify the originating station on the ring and are associated with the specific broadcast domain. These tags are removed when the traffic leaves the ring. For Ethernet, these ring tags are VLAN IDs (VIDs) and the insertion of VLAN tags is described in IEEE standard 802.1ad. When traffic enters the ring, the ingress node tags the traffic with a working-path VID which also identifies the entry point to the ring.

It should be noted that the virtual ring mechanism uses VLAN tagging, and configured VLAN forwarding. This behavior can be deployed on nodes in conjunction with other styles of Ethernet forwarding such as spanning tree or static configuration of MAC tables via simply partitioning the VLAN space.

Ring nodes perform normal Ethernet bridging operations, in particular populating the forwarding database via source learning. Although traffic in each broadcast domain is distinguished by a plurality of VLAN IDs (one per ring node for each of the working and protection paths), Shared VLAN Learning (SVL) permits the set of ring nodes to use a common set of learned MAC forwarding information. In order to preserve directionality around the ring, "port aliasing" is performed to record a port direction that is opposite to the port direction that would normally be learned by the node in traditional bridge operation. For example, in an Emulated LAN (ELAN) implementation, MAC addresses are only learned in one direction around the ring, i.e. on the working path. A packet observed as arriving on one ring port has source learning recorded as if the packet arrived on the other ring port. In this way, although the ring physically attaches to the node via two distinct ports, it logically appears as a single port. For ELAN, MAC learning is disabled on all protection-path VIDs.

Traffic only ingresses or egresses the ring via the working path. This is achieved by standard VLAN configuration such that off-ring ports associated with the ring broadcast domain are not blocked for the set of working VLANs associated with the ring. Copies of broadcast, multicast or packets for which the path to the destination is unknown by the ring nodes will typically egress the ring at all ports associated with the ring broadcast domain. A copy of such packets will traverse the ring back to the node of origin where the ring tag allows such packets to be identified as having circumnavigated the ring and consequently discarded at the originating node (termed "source stripping"). Packets directed around the ring may also encounter ring nodes which have "learned" off-ring connectivity, at which point the packet will be removed from the ring and forwarded to the off-ring destination (termed "destination stripping").

In the event of a failure in a span between two nodes in the ring, the ring folds as a resiliency mechanism to isolate the failed span. To enable ring folding, each node has a cross-connect for cross-connecting the working path to the protection path, which is implemented by VLAN translation, the working VLAN is mapped 1:1 to a protection VLAN forwarded in the reverse direction to the working path. Thus, if a span fails, the two end nodes immediately adjacent to the span failure isolate the failure by cross-connecting their working and protection paths. This cross-connection folds the ring to thus transfer traffic from the working path onto the protection path at the first of the two end nodes immediately adjacent the failure. The traffic is then carried over the protection path all the way to the second of the two end nodes immediately adjacent the failure whereupon the traffic is cross-connected back onto the working path for egress from the working path. In this way, "learned" forwarding information used for destination stripping, and tag information associated with source stripping is fully applicable independent of the fault status of the ring, and a ring failure is transparent to all nodes not immediately adjacent to the failure (which perform the selector operation of mapping the working to the protection paths).

Therefore, existing specified bridge implementations employing the tagging of ring traffic using Q-in-Q stacking, VLAN translation and by using Shared VLAN Learning in combination with port aliasing (to permit source learning to be applied to a broadcast domain implemented as a unidirectional ring path), a virtual Ethernet ring can be constructed that does not suffer from the shortcomings that hamper prior-art implementations. Moreover, the ring is made resilient by virtue of the cross-connects at each node which allow the ring to fold to isolate a span failure. Even once the ring has folded, traffic continues to ingress to or egress from the working path only.

Accordingly, an aspect of the present invention provides a method of routing frame-based traffic over a resilient virtual ring having a commonly routed working path and a protection path per ring node. The method includes the steps of defining, for each node of the ring, a plurality of unique ring tags that uniquely identify each one of the nodes and whether the working path or the protection path is to carry the traffic, and tagging frames in the virtual ring with one of the ring tags to uniquely identify both the node that has tagged the frames and whether the traffic is being carried over the working path or the protection path.

The frame-based traffic can be Ethernet, in which case the ring tags are VLAN IDs (VIDs) that are tagged to the Ethernet frames using Q-in-Q VLAN stacking.

Another aspect of the present invention provides a resilient virtual ring having a plurality of nodes interconnected by a working path and a protection path, each of the plurality of nodes including ingress and egress ports for frame-based traffic entering and leaving the virtual ring, wherein each node comprises a plurality of ring tags for uniquely tagging traffic in the ring, the ring tags identifying both the node that has tagged the traffic and whether the traffic is carried by the working path or the protection path. Where the frame-based traffic are Ethernet frames, Q-in-Q VLAN stacking enables tagging of the frames with unique VLAN IDs (VIDs).

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE INVENTION

In general, and as will be elaborated below with respect to the specific embodiments illustrated in FIGS. 1-6, the present invention provides both a resilient, virtual ring for frame-based traffic such as, preferably, Ethernet as well as a method of routing frame-based (e.g. Ethernet) traffic over a resilient, virtual ring. Although the embodiments described below are implemented in Ethernet, it should be understood that the invention could be applied to other frame-based networks.

Figure 1A:
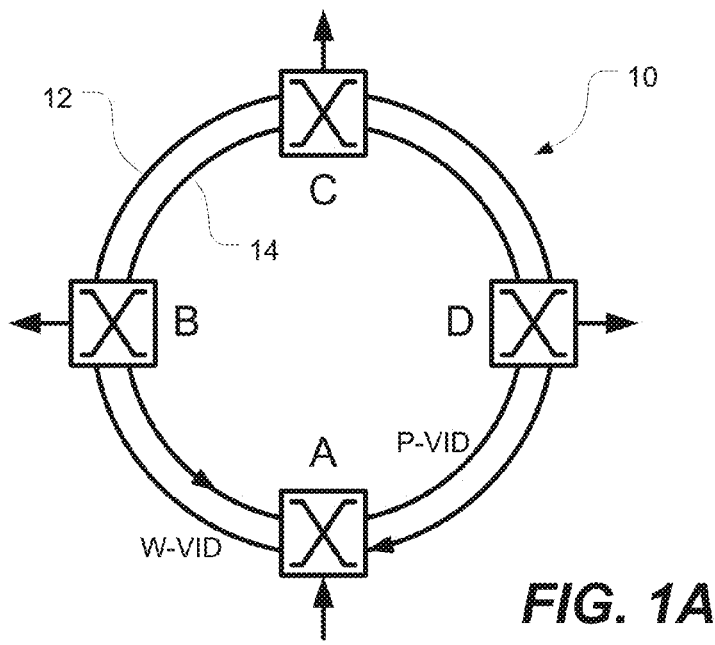
FIG. 1A is a schematic illustration of an Ethernet VLAN ring configured for 1:1 protection for ELAN or Source Specific Broadcast (SSB) in accordance with an embodiment of the present invention.

A resilient, virtual Ethernet ring designated generally by reference numeral 10 in FIG. 1A has a plurality of nodes (labelled A, B, C and D) interconnected by a working path 12 and a protection path 14 per ring node, FIG. 1A being an exemplar of a single instance of what would be replicated once per node on the ring. Each path being implemented via VLAN configuration (the blocking and unblocking of ports). As will be appreciated by those of ordinary skill in the art, the virtual ring can be virtualized from a non-ring topology such as a mesh; in other words, there does need to be an actual physical ring architecture for implementation of this virtual ring. Furthermore, it should be understood that, while four nodes are illustrated, this is merely presented by way of example, i.e. the number of nodes on the ring can vary.

Each of the plurality of nodes A-D may include ingress ports and egress ports for traffic entering and leaving the virtual ring, respectively. Similarly, the virtual ring may transit nodes which do not have ingress/egress ports but do participate in ring behavior. Associated with each node is a set of ring tags for tagging the frames of traffic in the ring. In other words, a plurality of unique ring tags are defined for each node of the ring. The ring tags identify whether the associated ring path is the working path or the protection path and the unique identity of the ring node on that path. So a set of VLAN tags (one per ring station) is associated with the working path of a unidirectional ring and a corresponding set of tags is associated with the protection path of a unidirectional ring. The routing of the protection path being congruent with the working path, the forwarding direction is thus simply the reverse of that of the working path.

In the preferred embodiment, the ring tags are virtual local area network identifiers or VLAN IDs (VIDs) for tagging Ethernet frames in the ring. Thus, in the generalized case, each node in the ring has a unique set of W-VID and P-VID identifiers that are used to tag traffic in the ring so as to identify the node that has tagged the traffic as well as which of the working path and protection path is carrying the traffic. The VIDs identify both a specific virtual ring (i.e. in a trivial topology case "east" or "west"), whether the traffic is carried on the working path or on the protection path, and the node originating traffic onto that ring. It should be noted that, as the technique permits the virtualization of VLAN tagged rings, a node could conceivably participate in many disjoint virtual rings and be provisioned with a corresponding set of VLAN tags to participate in each ring.

The Ethernet frames can be tagged using Q-in-Q stacking (also written as QinQ). Q-in-Q stacking is an encapsulation protocol defined in IEEE 802.1ad which is hereby incorporated by reference.

For the purposes of this specification, the expression "west", "westward" or "westbound" shall mean clockwise around the ring whereas the expressions "east", "eastward" or "eastbound" shall mean counter-clockwise around the ring.

In the preferred embodiment, the virtual Ethernet ring is constructed so that traffic entering the ring is forwarded along the working path, and may only leave the ring via the working path, traffic on the protection path is constrained to the ring to prevent undesirable duplication to off-ring nodes. Traffic is never inserted directly into the protection path, so the fact that it is an uninterrupted ring with no egress is a non-issue. Traffic is only cross-connected onto the protection path when the ring structure has been broken due to a fault. Thus, in the preferred embodiment, the frame-based traffic entering a given node is tagged with a VID that identifies that the traffic is being inserted onto the working path and the point of insertion. Furthermore, in the preferred embodiment, the ring is said to be "unidirectional" because the working path is unidirectional in the arbitrarily chosen direction around the ring while the protection path is also unidirectional albeit in the opposite direction around the ring. The actual association of traffic from an off-ring point to a particular ring-based broadcast domain is performed by normal Ethernet classification means as specified in 802.1ad whereby either tag or port information is used as a ring selector. Similarly a ring node may implement ports wholly not associated with ring behavior.

Thus, when traffic enters the ring at a node (hereinafter an "ingress node"), each packet entering the ring is tagged with a unique VID identifying to the switch fabric that the traffic is to be inserted onto the working path of a specific virtual ring. Since the working path is unidirectional, no routing decision needs to be made at the ingress node, which therefore obviates the need for a direction-determining MAC-PHY chip at the ingress node which, as noted above, is not only an expensive component but only limits bit-rate. It should be noted that VLANs are bi-directional, but uni-directionality is an artefact of how VLANs are used to create ring paths. As only a single node may insert traffic tagged with the VID of a specific working VLAN, and that VLAN will be blocked for the port corresponding to the return path once traffic has circumnavigated the ring, there will be only one egress port for the VLAN from the ring node.

Moreover, since the traffic entering the ring is tagged with a VID that is unique, and port blocking for that VID is performed on the return port for the virtual ring, the ingress node will perform "source stripping", i.e. discarding traffic that has returned "unclaimed" to the ingress node. In other words, traffic is discarded (stripped out) if none of the other nodes in the ring recognize the destination MAC address or if the packet was intended to be replicated to all ring nodes. In other words, if traffic has circled back around the entire ring without being claimed by any other node, then it is discarded by the ingress node (because the working VLAN is blocked on the port of return). Thus, the ingress node discards received traffic that is tagged with the ring tag assigned by the ingress node when the traffic first entered the ring.

Source stripping thus ensures that traffic does not loop endlessly around the ring. If another node on the ring recognizes the MAC address as being one that is served by that node, then the node (acting as an "egress node", that is) forwards the packet to a non-ring port. It should be noted that the actual forwarding behavior of ring nodes is that of standard 802 bridge forwarding. Broadcast, multicast and unknown packets are forwarded on both ring ports and replicated on local non-ring ports which are configured to participate in the ring broadcast domain. A ring node may have a MAC forwarding entry for a given destination address that points to a ring port or points to an off-ring port. In the scenario where a MAC forwarding entry exists for an "off-ring" port, the ring node will (as an artefact of normal bridge operation) perform "destination stripping" such that the packet only traverses a portion of the overall ring.

In accordance with a preferred embodiment of the present invention, each node also includes a "port aliasing module" for receiving the learned MAC addresses and for recording in the forwarding table a port direction that is opposite to an actual port direction detected by the node. As the ring/broadcast domain is unidirectional, it logically is a single port but in actual implementation is an ingress and an egress. Normal Ethernet source learning will attempt to associate learned MAC addresses of traffic received from other ring nodes with the ingress port, while the desirable behavior is to actually associate the forwarding for those MAC addresses to the egress port for the ring as the only viable path around the ring is unidirectional. Port aliasing permits the translation of learned information from ingress to egress prior to forwarding of traffic. This may be done prior to or subsequent to insertion of learned information into the local forwarding database. Precisely when the value is aliased is an implementation issue.

FIG. 1A is a schematic illustration of an Ethernet VLAN ring configured for 1:1 protection for Emulated LAN (ELAN) or Source Specific Broadcast (SSB) in accordance with an embodiment of the present invention. In this example, the ring 10 has working and protection paths interconnecting four nodes A, B, C and D. In this example, traffic inserted at A is tagged with a Working VID (W-VID) corresponding to a configured working path routed A, B, C, D. There is also configured a protection VID (P-VID) configured in the reverse direction D, C, B, A with corresponding port membership for the VIDs being configured on the ring nodes. In this example, the VIDs are referenced with respect to Node A. Similar and co-routed (but different VIDs) would of course also be assigned for Nodes B, C and D. For Emulated LAN (ELAN), a total of two VIDs per virtual ring per ring node are required. For Source Specific Multicast (emulation of a p2mp, i.e. a point-to-multipoint, tree over the ring), a total of 4 VIDs per virtual ring are required. For Source Specific Broadcast (SSB), a total of two VIDs per virtual ring are required, in this case Working and Protection. In a simple variant, the VID can further identify which of the two directions around the ring the traffic is carried. Thus, in this particular variant, a West Working VID, West Protection VID, East Working VID and East Protection VID are defined for each node and, depending on which of the two directions is arbitrarily chosen for the working path, either the west VIDs or the east VIDs are used.

Figure 1B:
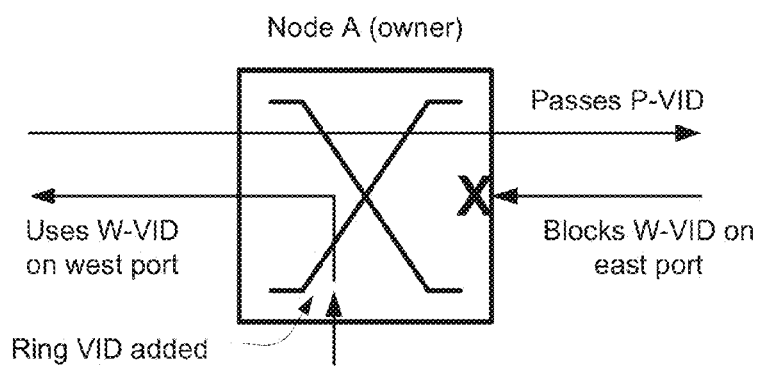
FIG. 1B is an enlarged schematic illustration of Node A of FIG. 1A operating in a fault-free state.

FIG. 1B is an enlarged schematic illustration of Node A of FIG. 1A operating in a fault-free state. In this example, Node A adds a ring tag to all the Ethernet frames (traffic) entering the ring. In this case, the ring tag added to the frames is W-VID because the traffic is being routed on the working path. As shown in FIG. 1B, Node A passes the P-VID and blocks the W-VID on the east port.

Figure 1C:
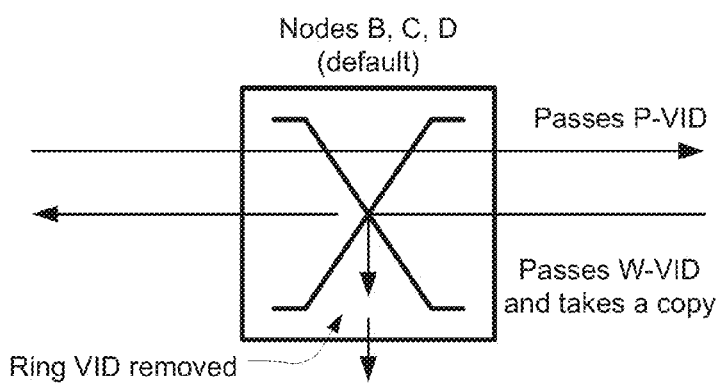
FIG. 1C is an enlarged schematic illustration of Nodes B, C and D of FIG. 1A operating in a fault-free state.

FIG. 1C is an enlarged schematic illustration of Nodes B, C and D of FIG. 1A operating in a fault-free state. In this example, Nodes B, C and D pass the P-VID (as did Node A) but these nodes pass the W-VID and takes a copy, removing the ring tag (VID) when the traffic is taken off the ring.

Accordingly, large (metro-sized), simple and inexpensive Ethernet rings can be implemented using 802.1Q-compliant hardware, i.e. using Q-tagging to form a resilient QinQ ring whose behavior appears to be that of an 802.1Q-compliant bridge. Furthermore, as will be described below, these rings can be made resilient.

Resiliency (1:1 Protection)

The virtual Ethernet ring is made resilient (or "fault-tolerant") by virtue of its ring topology (which is an inherently resilient topology because it is capable of ring folding to isolate a span failure), the presence of a protection path providing 1:1 protection, and the presence of cross-connects at each node that are capable of "hairpinning" the traffic when the ring folds, as is explained in the following paragraphs.

Each node in the ring has its own cross-connect for cross-connecting the working path to the protection path. This enables ring folding in response to a failure detected in a span of the ring. Detecting a span failure can be done using any known span failure detection mechanism such as described in IEEE 802.1ag or 802.3ah EFM ("Ethernet First Mile"), which are hereby incorporated by reference. Folding the ring isolates the span failure and, due to the availability of the protection path, ensures that traffic continues to be forwarded seamlessly to destination nodes.

Figure 2A:
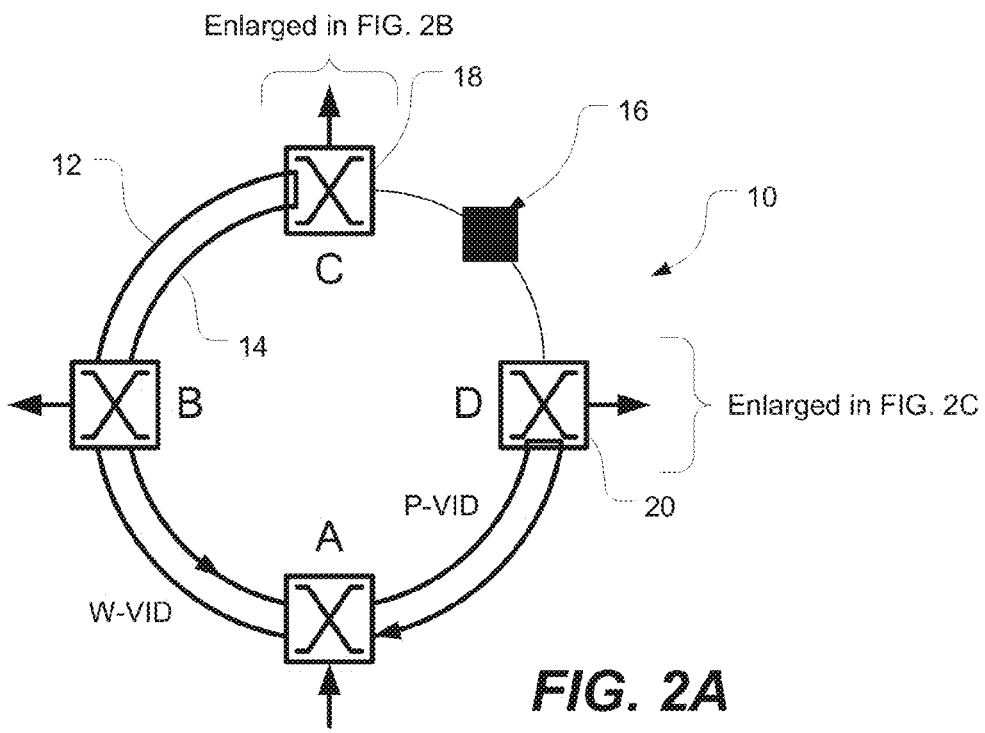
FIG. 2A is a schematic illustration of how the Ethernet VLAN ring of FIG. 1A folds in response to a failure in the span between Nodes C and D.

As shown in FIG. 2A, the ring 10 can fold in response to a span failure 16 by cross-connecting the working path 12 and the protection path 14 at the two "end nodes" 18, 20 immediately on either side of the span failure. This will be referred to herein as "hairpinning" since the traffic takes what can be visualized as a "hairpin curve" (as shown in FIG. 2A) as it is switched from the working path onto the protection path at the first end node 18, i.e. the last node that the traffic encounters on the working path just before the span failure. The traffic is then carried all the way back to the second end node 20 on the protection path (in the opposite direction) at which point this same traffic is then "hairpinned" again (i.e. cross-connected) back onto the working path. The failed span provides the "selector" synchronization mechanism for the protection switch. The net effect of the cross connecting at both ring nodes adjacent to the failure is that the protection path acts as a "bypass" to loop the traffic back to the working path while preserving the unidirectionality of the ring. Folding the ring using this double-hairpin arrangement not only preserves the unidirectionality of the working path but also ensures that traffic can only ingress or egress the ring from the working path. In other words, the working path always remains the working path even after a span fault.

Figure 2B:
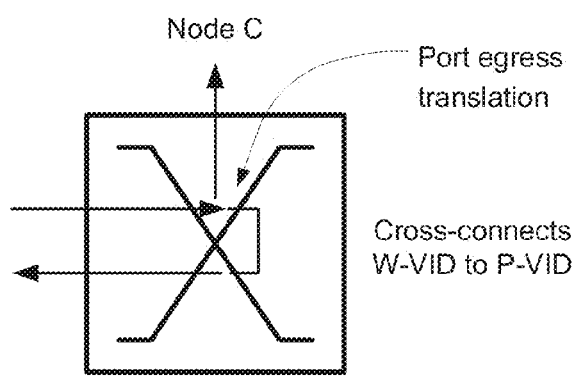
FIG. 2B is a schematic illustration of the operation of Node C during ring folding.
Figure 2C:
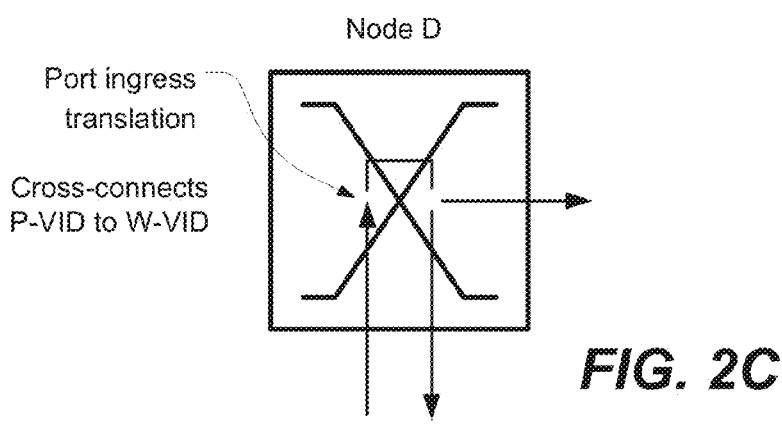
FIG. 2C is a schematic illustration of the operation of Node D during ring folding.

As shown in FIG. 2B, the first end node 18 (i.e. Node C in this example) cross-connects W-VID to P-VID (to thus effect a port egress translation). Similarly, as shown in FIG. 2C, the second end node 20 (i.e. Node D in this example) cross-connects P-VID to W-VID (to thus effect a port ingress translation).

A useful attribute of this arrangement is that protection switching is "hitless" with respect to MAC learning for ELAN and SSM. In other words, the ring folding preserves the topology with respect to learned MAC addresses.

As another example, FIGS. 3A-3C and FIGS. 4A-4C illustrate respectively the operation and folding of a virtual Ethernet ring configured for 1:1 protection to enable Source-Specific Multicast (SSM). In SSM, the configuration of connectivity is constrained such that only the source node (termed root) has connectivity to all other ring nodes (termed leaves), i.e. the other ring nodes can only communicate with the source. The SSM head-end only needs to know that a given ring node is interested, but does not need to know which one. Two working VIDs are required, one for the head-end to the leaves, and the other for the leaves to the head-end. Two protection VIDs are required, one for the working VID (root to leaf connectivity) and one for the working return VID (leaf to root connectivity). As shown in these figures, the working path 12 has a protection path 14, and the return path 22 is protected by a protection return 24.

Therefore, for a given SSM virtual ring, there are four paths, and four VIDs are defined for the ring. These VIDs can be designated as follows: Working (W-VID), Working Return (WR-VID), Protection (P-VID) and Protection Return (PR-VID).

Figure 3A:
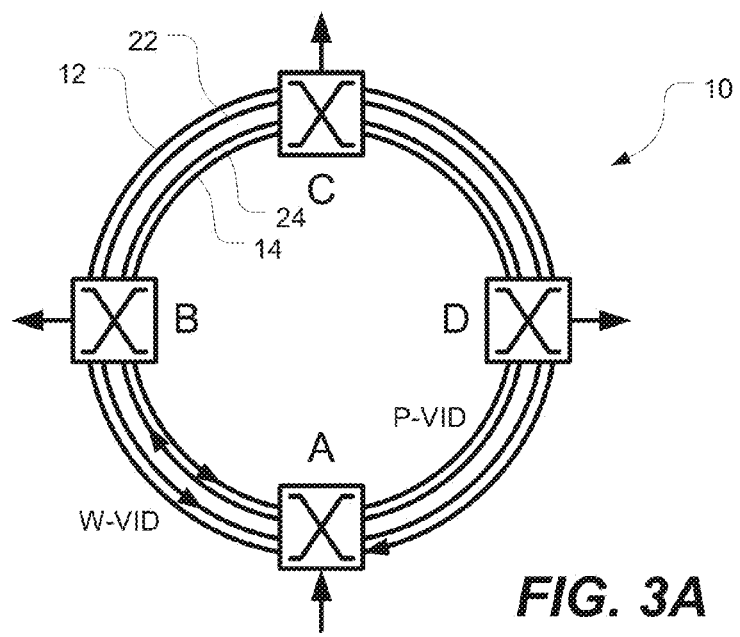
FIG. 3A is a schematic illustration of an Ethernet VLAN ring configured for 1:1 protection for SSM in accordance with another embodiment of the present invention.
Figure 3B:
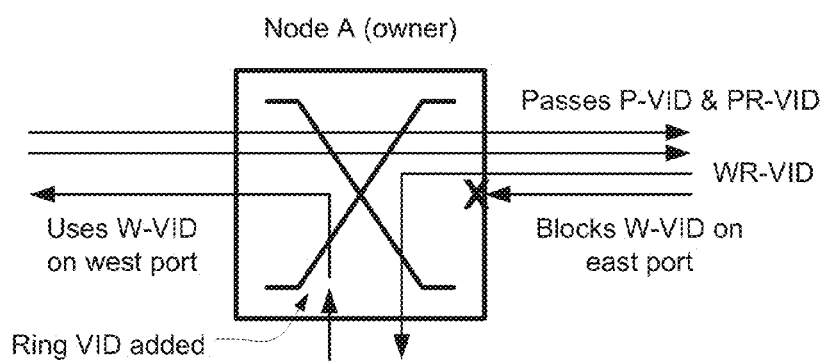
FIG. 3B is an enlarged schematic illustration of Node A of FIG. 3A operating in a fault-free state.

As shown in FIG. 3B, Node A operates in a fault-free state by passing P-VID and PR-VID while blocking W-VID on the east port. Traffic entering the ring at Node A is tagged with W-VID and sent onto the ring via the west port of Node A (assuming, for this example, a westward working direction) while return traffic is taken off the ring on WR-VID.

Figure 3C:
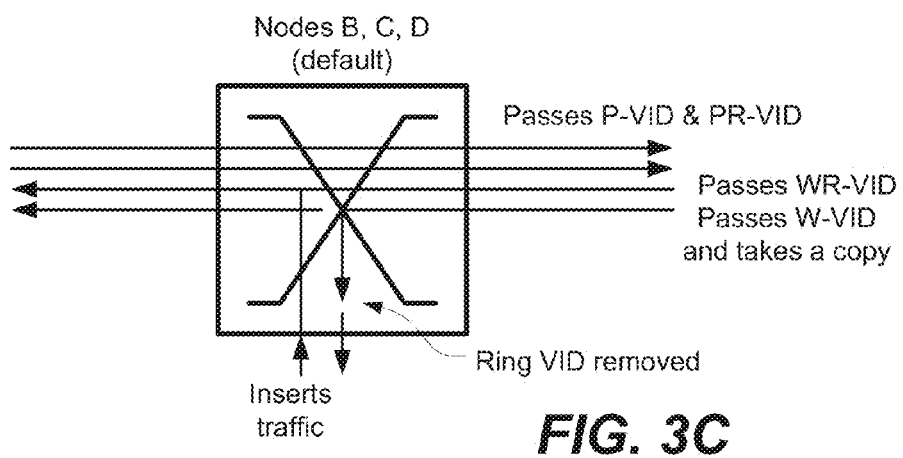
FIG. 3C is an enlarged schematic illustration of Nodes B, C and D of FIG. 3A operating in a fault-free state.

As shown in FIG. 3C, Nodes B, C and D operate in a fault-free state by also passing P-VID and PR-VID. At each of Nodes B, C and D, the node passes W-VID and takes a copy (stripping the VID as the traffic egresses the ring). Each of these nodes also passes WR-VID and inserts traffic onto W-VID by assigning a ring tag (W-VID).

Figure 4A:
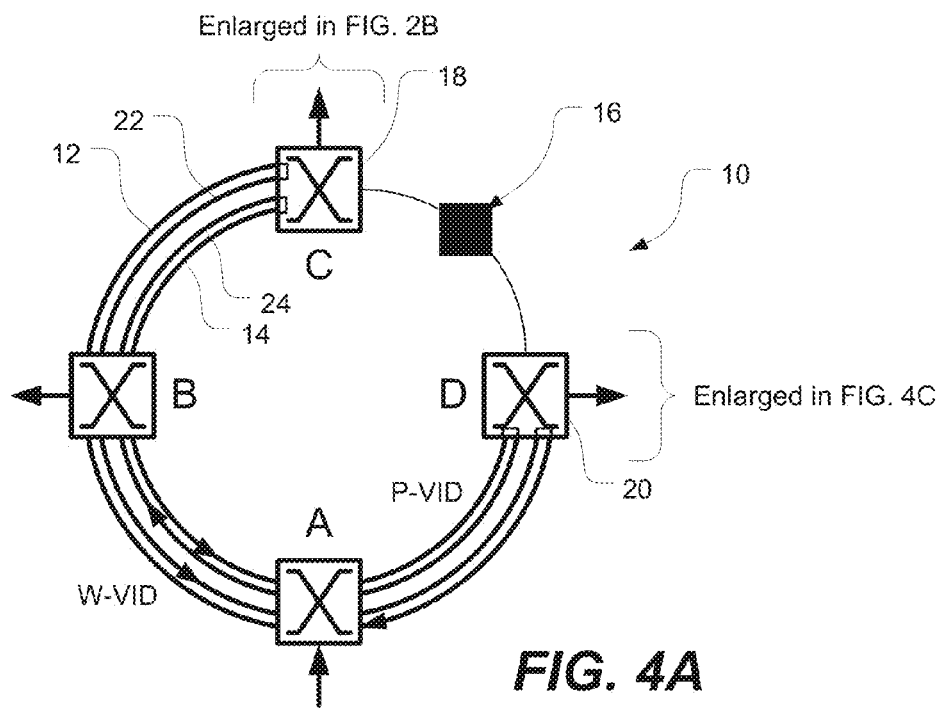
FIG. 4A is a schematic illustration of how the Ethernet VLAN ring of FIG. 3A folds in response to a failure in the span between Nodes C and D.
Figure 4B:
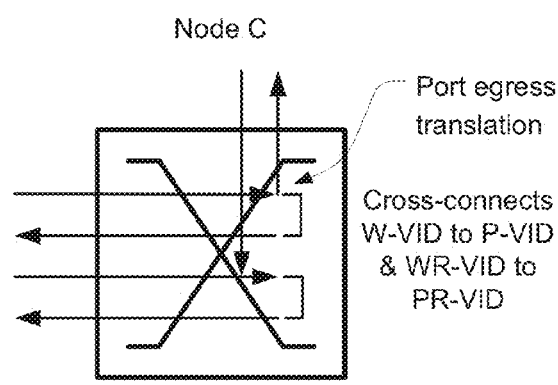
FIG. 4B is a schematic illustration of the operation of Node C during ring folding.
Figure 4C:
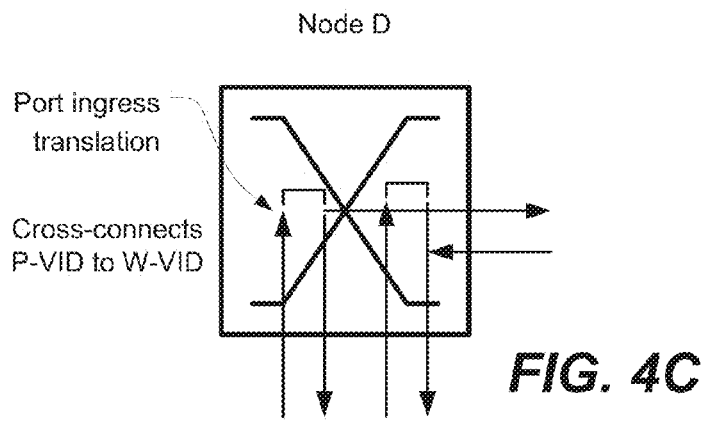
FIG. 4C is a schematic illustration of the operation of Node D during ring folding.

As shown in FIGS. 4A-4C, the Ethernet ring 10 folds in response to a failure 16 in the span, e.g. between Nodes C and D. As shown in FIG. 4B, Node C (the first end node 18) cross-connects W-VID to P-VID and WR-VID to PR-VID (to thus effect a port egress translation). As shown in FIG. 4C, Node D (the second end node 20) cross-connects P-VID to W-VID (to thus effect a port ingress translation).

Accordingly, a highly resilient, unidirectional, virtual Ethernet ring can be created having one protection path per working path, thus providing 1:1 protection for either ELAN and SSB implementations or an SSM implementation.

Resiliency (1+1 Protection)

Figure 5A:
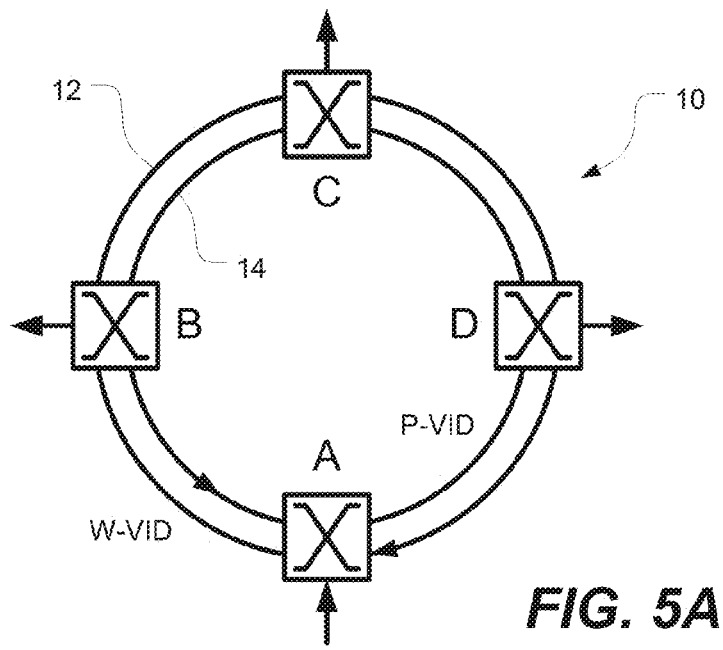
FIG. 5A is a schematic illustration of an Ethernet VLAN ring configured for 1+1 protection in accordance with another embodiment of the present invention.
Figure 5B:
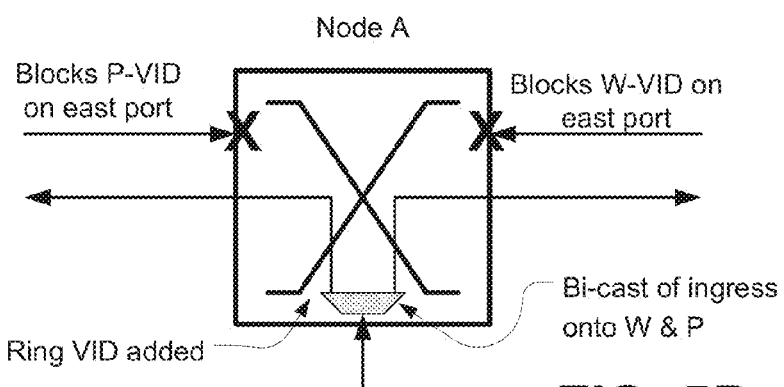
FIG. 5B is an enlarged schematic illustration of Node A of FIG. 5A operating in a fault-free state.
Figure 5C:
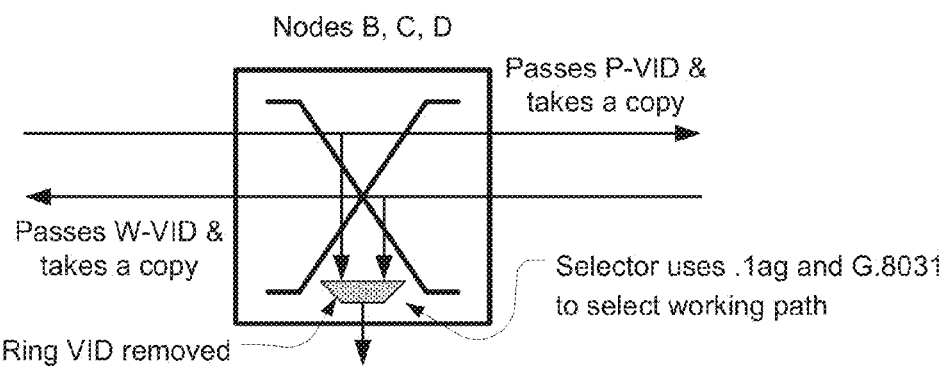
FIG. 5C is an enlarged schematic illustration of Nodes B, C and D of FIG. 5A operating in a fault-free state.

In another embodiment, as shown in FIGS. 5A-5C, a 1+1 protection arrangement can be implemented by sending ("bi-casting") traffic in opposite directions on both the working and protection paths 12, 14 of the ring 10. In this 1+1 protection scenario, the ingress node not only sends the same traffic (i.e. the same frames) in opposite directions around the ring, but it also sends Connectivity Fault Management (CFM) heartbeats in both directions around the ring. The CFM heartbeats enable a destination node on the ring to select one of the two received copies of the bi-cast traffic based on the characteristics of the CFM heartbeats received at the destination node.

As shown in FIG. 5B, Node A adds ring tags as traffic enters the ring as is bi-cast onto both the W-VID and P-VID. Node A also blocks P-VID and W-VID on the east port. As shown in FIG. 5C, each one of Nodes B, C and D has a selector that uses IEEE 802.1ag and G.8031 to select which of the two sets of bi-cast traffic it will treat as the working-path traffic. The VID is stripped when traffic exits the ring. Each node passes W-VID and takes a copy. Each node also passes P-VID and takes a copy.

VID Seizing

At initialization of the ring, a range of VLANs is delegated to the operation of the ring, and the appropriate ring connectivity is configured via configuring of port membership for the VLAN set on each ring node. Each node may then self-discover and seize a set of unique ring tags (the subset of tags in the range delegated to the ring that will be used by the specific ring node). At each node, ring tags are randomly selected and tested. To test the ring tags, the node attempts to ping itself with a frame tagged with the selected working path ring tag. If the ring tag is not in use by any node in the ring, the node will be able to ping itself (i.e. there is uninterrupted connectivity around the ring). Otherwise, if the selected ring tag is already in use by another node in the ring, the node will not be able to ping itself because the actual owner of that selected working ring tag (i.e. another node) will have blocked the port for that ring tag in order to do source stripping.

For a virtual Ethernet ring (e.g. ELAN), each node would need to seize two unique VIDs. VID discovery and seizing is done by randomly selecting a potentially usable VID associated with a specific ring at each node being initialized, sending the potentially usable VID around the ring to try to ping oneself and then seizing the VID if it returns unclaimed to the node that sent the VID. These steps are repeated until the node being initialized has pinged itself at least twice. The seizing is complete when a block of 2 VIDs are "owned" by the node being initialized.

When the entire ring powers up at once, it is important to institute random delays in the self-discovery process to avoid "race conditions". Thus, a given node should wait a random period of time before selecting a ring tag and attempting to ping itself.

Moreover, to be safe, the node should ping itself a couple of times with the same ring tag to be certain that the VID is truly not in use and thus can legitimately be seized. When the node seizes a ring tag, it modifies the configuration for the seized range of ring tags from the default to the owned state.

Node Implementation

Figure 6:
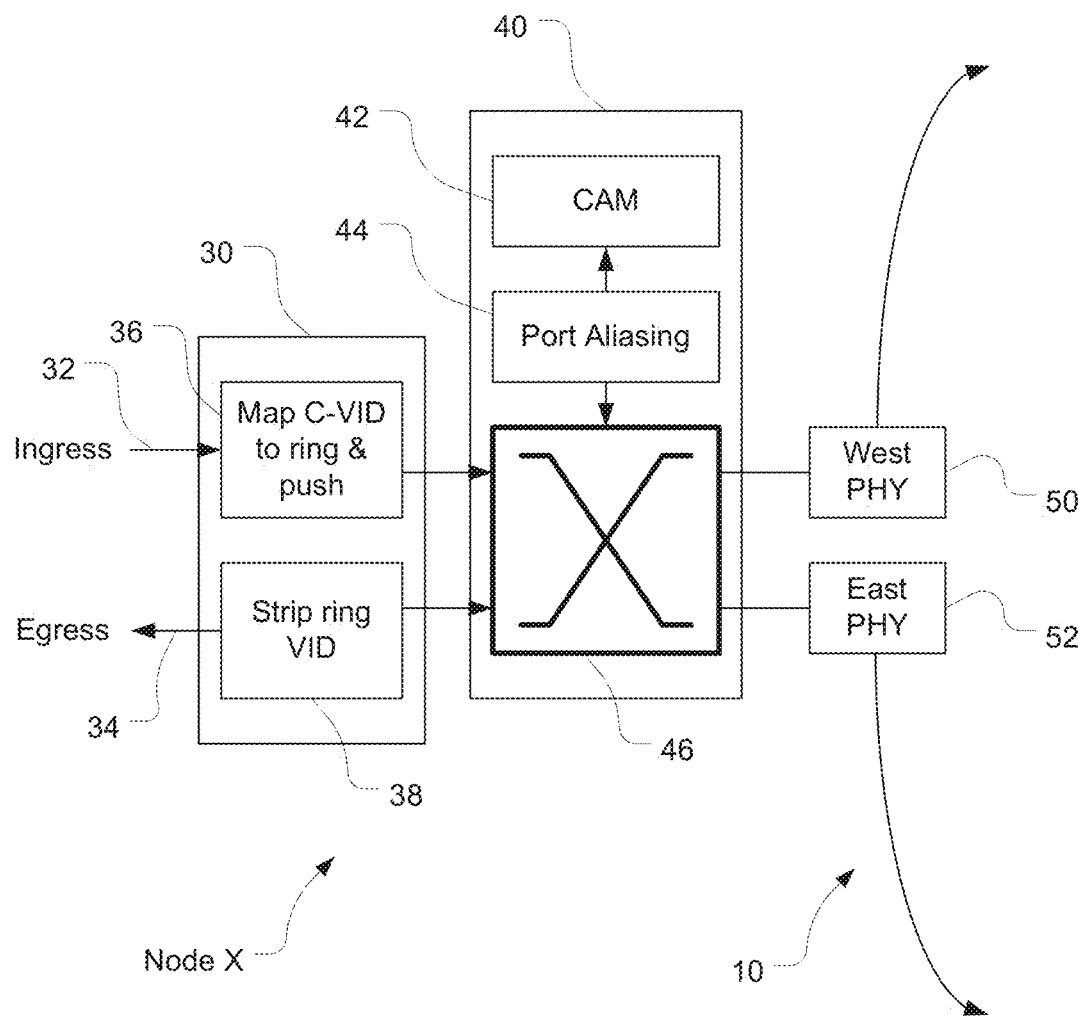
FIG. 6 is a schematic illustration of an Ethernet ring node in accordance with an embodiment of the present invention.

FIG. 6 schematically illustrates, by way of example only, an Ethernet ring node ("Node X") in accordance with an embodiment of the present invention. As shown in FIG. 6, Node X has a routing switch 30 (e.g. Nortel 8608 or equivalent) and a switch fabric module 40 (e.g. Nortel 8692 or equivalent). The routing switch 30 has an ingress port 32 and an egress port 34 for traffic entering and exiting the ring. The routing switch 34 includes a mapping module 36 (or other such means) for mapping a C-VID (Customer VID) received on the ingress port to a ring VID and pushing the frames to the switch fabric module 40. The routing switch 34 also includes a VID-stripping module 38 (or other such means) for stripping the ring VID from the traffic before it exits the ring via the egress port 34.

As further illustrated in FIG. 6, the switch fabric module 40 includes forwarding memory 42, a port aliasing module 44, and a 802.1Q bridge 46. The memory 42 maintains the forwarding table, e.g. the Forwarding Information Base, into which MAC addresses and port directions are stored. The port aliasing module 44, as mentioned above, stores a port direction that is opposite to the actual learned direction. This port aliasing preserves the unidirectionality of the ring. Traffic is switched by the 0.1Q bridge 48 onto either the West PHY 50 or the East PHY 52.

Applications of the Virtual Ethernet Ring

The ring is able to support a variety of Ethernet applications, including ELINE, E-TREE, Emulated LAN (ELAN), Source-Specific Multicast (SSM), and Source-Specific Broadcast (SSB). In the ELINE and E-TREE scenarios, the ring serves as a Provider Backbone Bridge (PBB) within a Provider Backbone Transport (PBT) network, which are described in U.S. Patent Application Publication 2005/0220096 entitled TRAFFIC ENGINEERING IN FRAME-BASED CARRIER NETWORKS published Oct. 6, 2005, which is hereby incorporated by reference. For ELINE and E-TREE, the PBT provides e2e PS (end-to-end protection switching) so the ring must not interfere with the PBT VID range. For ELAN, the ring operates as a resilient distributed switch. For SSM, the ring acts to resiliently fan out a dynamically varying set of (S,G) multicast groups to a set of ring nodes. For SSM, the ring must also provide a constrained return path for IGMP snooping/filtering. For SSB, the ring acts to resiliently fan out an invariant bundle of (S,G) multicast groups to a set of ring nodes, but unlike SSM, no return path is required. The virtual ring should be able to support all of these applications simultaneously.

Node Configurations for Specific Implementations

In order to simultaneously accommodate different applications or "behaviors", e.g. ELAN, SSM and SSB, a range of VIDs is designated for each type of application or "behavior", i.e. a range of VIDs is designated for ELAN, another range of VIDs for SSM and yet another range of VIDs for SSB. The default is for each node to pre-configure each range and then, as required, seize specific VIDs in each range.

For ELINE (such as Provider Backbone Transport, which offers its own end-to-end resiliency), a fixed network VID range is assigned.

Emulated LAN (ELAN) can be enabled by specifying, in a generalized case, only two VIDs per ring node, namely a Working VID (W-VID) and a Protection VID (P-VID). In the specific case where the VIDs are to further identify ring direction, four VIDs are defined per ring node, e.g. a West Working VID, a West Protection VID, an East Working VID and an East Protection VID. Each node needs to both relay and take a copy of Working VIDs. Each node simply needs to connect Protection VIDs between ring ports. MAC learning is disabled on the Protection VIDs.

Source Specific Multicast (SSM) can be enabled by specifying four VIDs per SSM ring (for the generalized case), i.e. a Working VID, Working Return VID, Protection VID and Protection Return VID. Each node needs to both relay and take a copy of Working VIDs. Each node needs to connect Protection and Working Return VIDs together. MAC learning is disabled on all VIDs.

Source Specific Broadcast (SSB) can be enabled by specifying two VIDs per source node (W-VID and P-VID) per ring. Each node needs to both relay and take a copy of Working VIDs. Each node simply needs to connect Protection VIDs between ring ports. MAC learning is disabled on all VIDs.

The embodiments of the invention described above are intended to be exemplary only. The scope of the invention is therefore intended to be limited solely by the scope of the appended claims.

What is claimed is:

1. A resilient Ethernet ring network for forwarding frame-based traffic, the resilient Ethernet ring network comprising:
a plurality of Ethernet nodes; and
a first plurality of bidirectional transmission links connecting the plurality of Ethernet nodes in a ring;
the plurality of Ethernet nodes being configured to define on the ring network, for each respective Ethernet ring node, a respective pair of unidirectional Virtual Local Area Networks (VLANs), a respective first VLAN of each respective pair of VLANs being designated as a respective working path associated with the respective Ethernet ring node and having a respective first direction around the ring and a respective second VLAN of each pair of VLANs being designated as a respective protection path associated with the respective Ethernet ring node and having a respective second direction around the ring, the respective second direction being opposite to the respective first direction; and
each Ethernet ring node being configured:
to receive from an adjacent node on the ring, an Ethernet frame having a VLAN tag identifying one of a working path associated with an ingress Ethernet ring node at which the frame entered the ring and a protection path associated with the ingress Ethernet ring node;
when the VLAN tag of the frame identifies the working path associated with the ingress Ethernet ring node:
when the ingress Ethernet ring node associated with working path or the protection path identified by the VLAN tag of the frame is the Ethernet ring node, to drop the frame;
when the frame has a destination address served by the Ethernet ring node, to forward the frame off the ring toward the destination address;
when no fault is present in the ring adjacent the Ethernet ring node in the direction of the working path associated with the ingress Ethernet ring node, to forward the frame on the ring on the working path associated with the ingress Ethernet ring node; and
when a fault is present in the ring adjacent the Ethernet ring node in the direction of the working path associated with the ingress Ethernet ring node, to replace the VLAN tag of the frame with a VLAN tag identifying the protection path associated with the ingress Ethernet ring node, and to forward the frame on the ring on the protection path associated with the ingress Ethernet ring node; and
when the VLAN tag of the frame identifies the protection path associated with the ingress Ethernet ring node:
when no fault is present in the ring adjacent the Ethernet ring node in the direction of the protection path associated with the ingress Ethernet ring node, to forward the frame on the ring on the protection path associated with the ingress Ethernet ring node; and
when a fault is present in the ring adjacent the Ethernet ring node in the direction of the protection path associated with the ingress Ethernet ring node, to replace the VLAN tag of the frame with a VLAN tag identifying the working path associated with the ingress Ethernet ring node.

2. The ring network of claim 1, wherein a first node of the plurality of Ethernet ring nodes is configured to:
tag a frame entering the Ethernet ring at the first node with a VLAN tag identifying the working path associated with the first node when no fault is present in the ring adjacent the Ethernet ring node in the direction of the working path associated with the first node; and
tag the frame entering the Ethernet ring at the first node with a VLAN tag identifying the protection path associated with the first node when a fault is present in the Ethernet ring adjacent the first node in the direction of the working path associated with the first node.

3. The ring network of claim 2, wherein each node of the plurality of Ethernet ring nodes is configured as recited in claim 2.

4. The ring network of claim 2, wherein the first node is configured to forward the tagged frame on the ring:
on the working path associated with the first node when the VLAN tag identifies the working path associated with the first node; and
on the protection path associated with the first node when the VLAN tag identifies the protection path associated with the first node.

5. The ring network of claim 4, wherein each node of the plurality of Ethernet ring nodes is configured as recited in claim 4.

6. The ring network of claim 4, wherein:
the first node is configured to tag the frame with the VLAN tag and to forward the tagged frame on the Ethernet ring only when the frame does not have a destination address served by the first node; and
the first node is configured to forward the frame off the Ethernet ring toward the destination address when the frame has a destination address served by the first node.

7. The ring network of claim 6, wherein each node of the plurality of Ethernet ring nodes is configured as recited in claim 6.

8. The ring network of claim 2, wherein the first node is configured to tag the frame using Q-in-Q encapsulation.

9. The ring network of claim 8, wherein each node of the plurality of Ethernet ring nodes is configured as recited in claim 8.

10. The ring network of claim 2, wherein the first node is configured to learn off-ring paths to destination address by observing traffic entering the Ethernet ring at the first node.

11. The ring network of claim 10, wherein each node of the plurality of Ethernet ring nodes is configured as recited in claim 10.

12. The ring network of claim 10, wherein each Ethernet ring node is configured to strip the Q-in-Q encapsulation off of the tagged frame when forwarding the frame off the Ethernet ring.

13. The ring network of claim 2, wherein the first node is configured to learn on-ring paths to destination addresses by observing traffic received over the working path associated with the first node from other nodes on the Ethernet ring.

14. The ring network of claim 13, wherein each node of the plurality of Ethernet ring nodes is configured as recited in claim 13.

15. The ring network of claim 13, wherein the first node is configured to forward traffic for each learned address for an on-ring path in a direction opposite to a port direction detected by the first node for the address, thereby preserving unidirectionality of the working path associated with the first node.

16. The ring network of claim 15, wherein each node of the plurality of Ethernet ring nodes is configured as recited in claim 15.

17. The ring network of claim 15, wherein the first node is configured to record in a forwarding table of the first node a port direction for each learned address for an on-ring path, the recorded port direction being opposite to a port direction detected by the first node for the address.

18. The ring network of claim 17, wherein each node of the plurality of Ethernet ring nodes is configured as recited in claim 17.

19. The ring network of claim 1, wherein each Ethernet ring node is configured to strip the VLAN tag off of the tagged frame when forwarding the frame off the Ethernet ring.

20. The ring network of claim 1, wherein each Ethernet ring node is configured to:
- send connectivity fault management (CFM) heartbeats on the Ethernet ring; and
- monitor CFM heartbeats to detect faults in the ring adjacent the respective Ethernet ring node.

21. The ring, network of claim 1, wherein each Ethernet ring, node of the plurality of Ethernet ring nodes is configured to:
- tag a frame entering the ring at the Ethernet ring node with a VLAN tag identifying the working path associated with the Ethernet ring node when no fault is present in the ring adjacent the Ethernet ring node in the direction of the working path associated with the Ethernet ring node; and
- tag the frame entering the ring at the Ethernet ring node with a VLAN tag identifying the protection path associated with the Ethernet ring node when a fault is present in the ring adjacent the Ethernet ring node in the direction of the working path associated with the Ethernet ring node.

* * * * *